F. HOLDMAN.
VEHICLE WHEEL.
APPLICATION FILED APR. 22, 1911.
1,063,881.
Patented June 3, 1913.
2 SHEETS—SHEET 1.
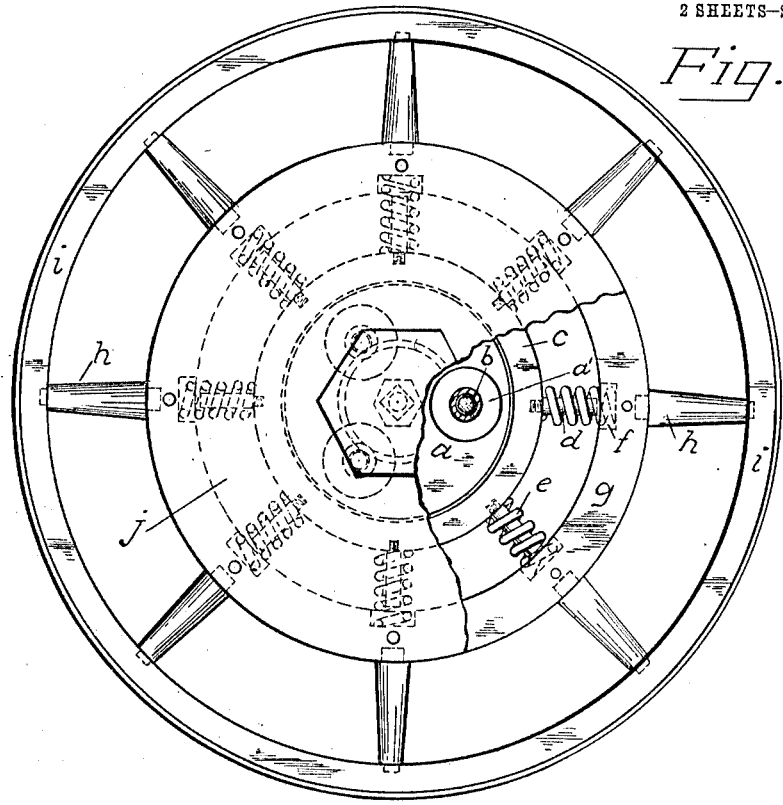
Fig. 1.
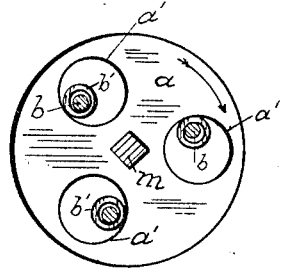
Fig. 2.
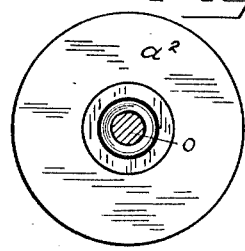
Fig. 3.
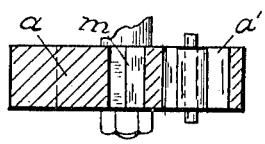
Fig. 2ᵃ.
WITNESSES:
Adolf Schulz
W. Lewis Coop.
INVENTOR
Frank Holdman
BY
Geisler
ATTORNEY F. HOLDMAN.
VEHICLE WHEEL.
APPLICATION FILED APR. 22, 1911.
1,063,881.
Patented June 3, 1913.
2 SHEETS—SHEET 2.
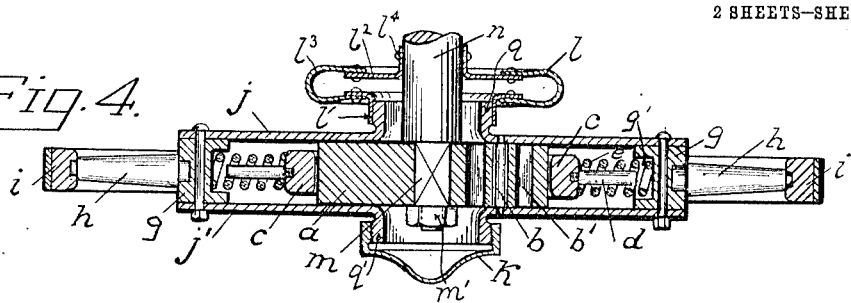
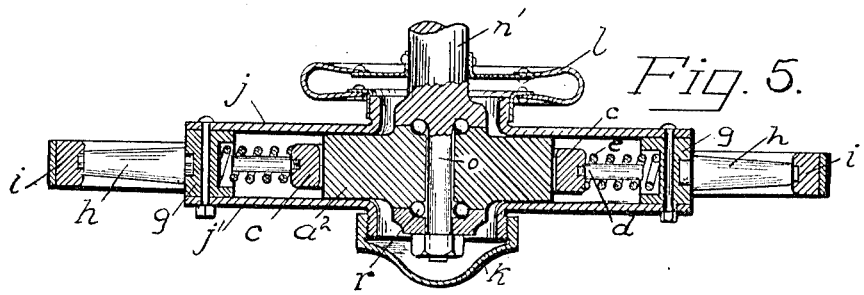
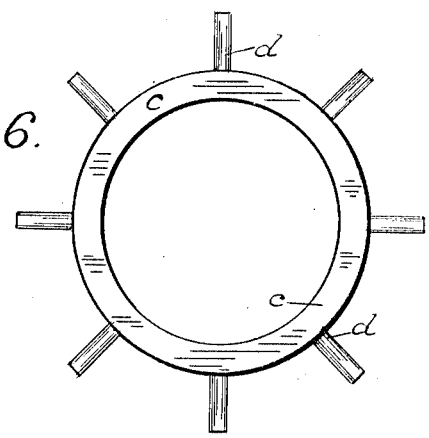
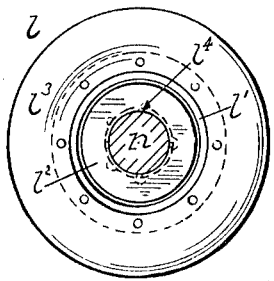
WITNESSES:
Adolf Schulz
W. Lewis Coop
INVENTOR
Frank Holdman
BY
ATTORNEY

UNITED STATES PATENT OFFICE.

FRANK HOLDMAN, OF ST. JOHNS, OREGON.

VEHICLE-WHEEL.

1,063,881.

Specification of Letters Patent. Patented June 3, 1913.

Application filed April 22, 1911. Serial No. 622,840.

*To all whom it may concern:*

Be it known that I, FRANK HOLDMAN, a citizen of the United States, and a resident of St. Johns, Multnomah county, State of Oregon, have invented a new and useful Improvement in Vehicle-Wheels, of which the following is a specification.

My invention relates to vehicle wheels in which the shocks due to inequalities of the road are neutralized by means of radially arranged springs interposed between the wheel rim and hub, and my invention has for its object to provide a vehicle wheel of the type referred to which shall include a lubricant chamber inclosing completely the radial springs and the hub, so as to effectively exclude all dust and dirt from the moving parts, and also to hold in such lubricant chamber an ample supply of lubricant, in which all such working parts are embedded.

My object, furthermore, is to provide that wall of the lubricant chamber through which the axle end projects with a cap adapted to accommodate the movement of the axle end relative to the wheel rim; and my invention also relates to self-propelling wheels, and in this connection has for its purpose to provide means for driving the traction wheels from the driven axle of the vehicle, and to incase such driving means in the lubricant chamber.

I attain these objects, and other incidental features hereinafter more fully described, by means of the device illustrated in the accompanying drawings, in which:

Figure 1 is a side view of one of the driven traction wheels embodying my improvement, part of the casing inclosing the hub being broken away, so as to illustrate the method used for driving the traction wheel from the driven axle of the vehicle; Fig. 2 is a side view of the hub of the traction wheel and the means operatively connecting the body of the wheel thereto; this view illustrating how the body of the wheel is driven by the rotation of the hub which is fast on the driven axle; Fig. 2ª is a horizontal section of the part shown in Fig. 2; Fig. 3 is a side view of the hub of a steering wheel; Fig. 3ª is a horizontal section of such hub; Fig. 4 is a horizontal section of one of the driven traction wheels; Fig. 5 is a similar section of one of the front or steering wheels; Fig. 6 is a side view and Fig. 6ˣ a horizontal section of the ring-like member mounted on the wheel hub and provided with external radial spoke-like pins for supporting the inner ends of the radial springs of the wheel; and Fig. 7 is a side view and Fig. 7ˣ is a horizontal section of the cap inclosing that side of the lubricant chamber inclosing the movable parts of the wheel through which the axle end projects, and illustrates the means employed for rendering the head of such cap yielding, in order to accommodate the movements of the axle end relative to the wheel rim.

Referring now in the first instance to the construction of the traction wheels illustrated in Figs. 1 and 4: $n$ represents an end of the driven axle, rotated by suitable devices on the vehicle (not shown) and through which rotation the traction wheels are revolved so as to propel the vehicle. Said axle end is made with a square portion $m$, on which is mounted a circular disk or hub $a$. On the latter is mounted an inner ring $c$, from the exterior of which project radially arranged spoke-like pins $d$, on which are supported the inner ends of the coil springs $e$, the outer ends of which are seated in sockets $g'$ therefor provided in an outer ring $g$. On the circumference of the latter are fastened the inner ends of the short spokes $h$, the outer ends of which are fastened in the wheel rim $i$. To the outer ring $g$ are fastened side-plates $j$, $j'$, which, together with the ring $g$, constitute the casing of what forms the lubricant chamber of my wheel. The plate $j$ is made with a neck $q$ having a machine finished circumference, on which is mounted a cap $l$. The latter comprises a ring $l'$ and a head $l^2$ connected by a flexible strip $l^3$. The flange $l^4$ of the head $l^2$ is fastened to the axle end $n$, and the ring $l'$ has a machine finished interior face so that it may rotate freely on the neck $q$. The casing side $j'$ is made with a neck $q'$ having a threaded circumference, on which is removably secured a cap $k$; the removal of the latter giving access to the nut $m'$ by which the disk $a$ is fastened to the axle $n$. The disk, $a$, as shown in Figs. 1 and 2, is made with circular holes $a'$, $a'$, $a'$. Transversely between the sides, $j$, $j'$, are affixed three pins $b$, distributed as illustrated in Figs. 1 and 2, and on said pins are mounted rollers $b'$. Upon the rotation of the axle $n$, and therewith the hub $a$, in the direction pointed by the arrow in Fig. 2, the rollers $b'$ are engaged with the hub $a$ and thus cause the body of the wheel to rotate. The purpose of the rollers $b'$ is to prevent wear of the pins $b$ in their contact with the hub $a$ during the act of transmitting motion.

It will be noted that the pins $d$, radially projecting from the ring $c$, extend only part way into the coil springs $e$, and thus accommodating the contraction of said springs without bringing the pins $d$ against the outer rim $g$ of the lubricant chamber.

The construction of the wheel illustrated in Fig. 5 is substantially the same as that illustrated in Fig. 4; the equivalent parts in the two types of wheels being designated by the same reference letters, and hence require no further explanation. In short, the only difference in the two types of construction is that $n'$ represents an end of the steering axle formed with a spindle end $o$, on which the disk $a^2$ rotates freely; and ball bearings $r$ being interposed between the parts so as to facilitate the rotation. It will be noted that the disk $a^2$ is free to rotate within the ring $c$, but since there is greater friction between the engaging surfaces of these two parts than between the disk $a^2$ and the spindle $o$, by reason of the interposed ball bearings, the hub $a^2$, and therewith the entire wheel, will generally rotate on the spindle $o$.

I claim:

In a vehicle, the combination of an axle and wheels mounted on the ends thereof, such wheels comprising a circular disk or hub mounted on the ends of the axle; an inner ring mounted on such hub, a larger ring encircling the inner ring, radially arranged coil-springs interposed between said outer and inner rings; spokes projecting outward of the outer ring, and a rim affixed on such spokes; side plates fastened to both sides of said outer ring and inclosing the space interior thereof; one of said side plates made with a central opening and having an exterior flange encircling such opening; a cap mounted on said central flange of one of said side plates; said cap comprising a ring and a perforated head, and a flexible strip connecting these parts, the axle-end projecting through the perforated head; and the head piece of the cap being fastened to the axle end, and the ring of the cap rotating on said central flange of the side plate.

FRANK HOLDMAN.

Witnesses:
  CECIL LONG,
  W. LEWIS COOP.

---

Copies of this patent may be obtained for five cents each, by addressing the "Commissioner of Patents, Washington, D. C."